Figure 1:
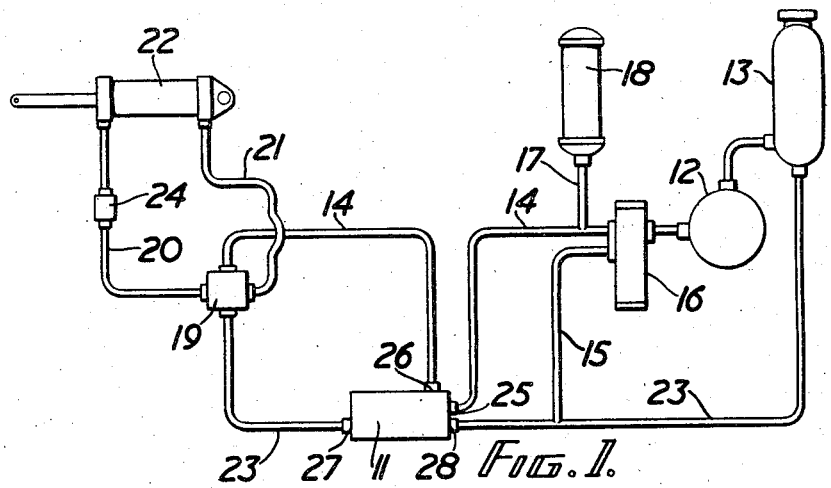

July 31, 1951  E. H. BOWERS  2,562,764
HYDRAULIC SYSTEM FOR CONTROLLING DELIVERY TO MOTORS
OF DIFFERING CAPACITIES
Filed May 2, 1949  2 Sheets-Sheet 1

ERIC HIDER BOWERS
INVENTOR
REYNOLDS & BEACH
ATTORNEYS
BY Charles L. Reynolds

July 31, 1951 E. H. BOWERS 2,562,764
HYDRAULIC SYSTEM FOR CONTROLLING DELIVERY TO MOTORS
OF DIFFERING CAPACITIES
Filed May 2, 1949 2 Sheets-Sheet 2
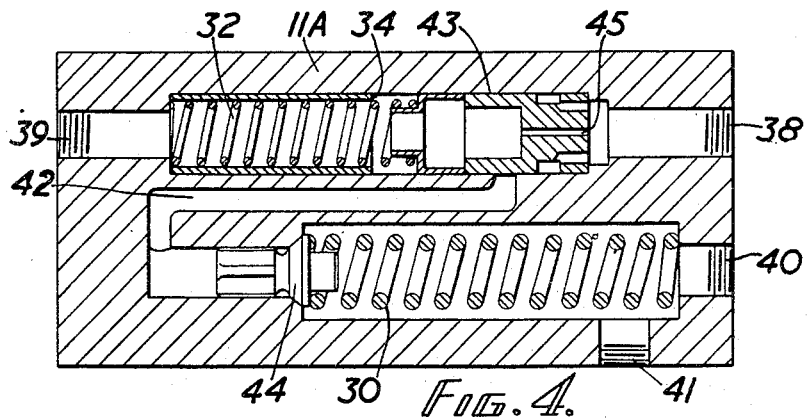
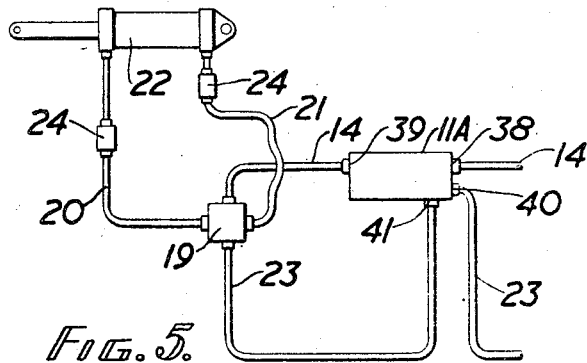
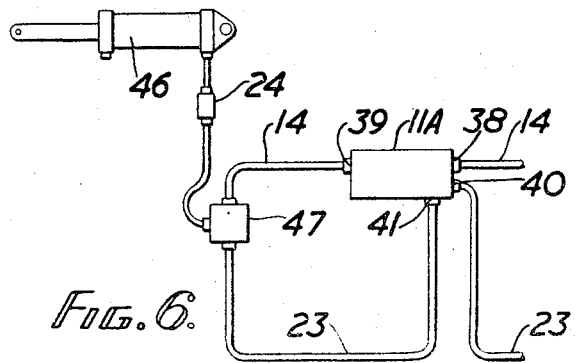
ERIC HIDER BOWERS
INVENTOR
REYNOLDS & BEACH
ATTORNEYS
BY Charles L. Reynolds Patented July 31, 1951

2,562,764

UNITED STATES PATENT OFFICE 2,562,764

HYDRAULIC SYSTEM FOR CONTROLLING DELIVERY TO MOTORS OF DIFFERING CAPACITIES

Eric Hider Bowers, Cheltenham, England, assignor to Dowty Equipment Limited, Cheltenham, England Application May 2, 1949, Serial No. 90,871
In Great Britain February 18, 1949

10 Claims. (Cl. 60—51)

This invention is concerned with hydraulic control systems for operating various services, such for example as aircraft flying controls or flaps, in which a pump operates in conjunction with unloading mechanism, e. g. a cut-out and by-pass mechanism, to feed fluid into a delivery line whenever the pressure in said line falls below a predetermied pressure. The delivery line usually has a branch leading to an accumulator, and whenever necessary supplies pressure fluid to a jack which is operatively connected with the service. The direction of travel of the jack is determined by the setting of a control valve. If a jack is so designed in relation to the pump and to the service it is to operate that the desired rate of operation of the service requires a rate of flow in the delivery line substantially the same as the output rate of the pump, the jack is said to be matched to the system. If, on the other hand, some form of restriction means in the jack system is necessary to prevent too rapid a rate of operation of a service, the jack is said to be unmatched.

Whereas the unloading mechanism may frequently be called into operation during actuation of the service. This repeated operation is undesirable and the primary object of the invention is to avoid it whilst retaining the normal function of the unloading mechanism for any matched jacks there may be in the system.

According to the present invention, there is provided between the delivery line and a return line of a hydraulic control system of the kind referred to, a by-pass passage-way including a relief valve adapted to open at a pressure less than the off loading pressure of the unloading mechanism, and a flow-responsive valve having a valve member movable with unmatched jack actuating flow to a position permitting flow along said passage-way, whereby whenever a service is being moved by an unmatched jack and there is sufficient pressure in the delivery line to hold the relief valve open, the pump, if called upon to feed the delivery line, will be enabled to maintain the rate of movement of the service while by-passing excess fluid through said passage way.

It will be seen that should the unloading mechanism of the pump be brought into operation at the commencement of or during the actuation of a service requiring a rate of flow in the delivery line less than the output of the pump, the excess from the pump will be able to return through the passage-way so that there is no need for any further operation of the unloading mechanism until after actuation of the service has been completed.

In some cases a restriction in the flow-responsive valve may constitute the sole restriction controlling the rate of movement of the jack.

Figure 2:
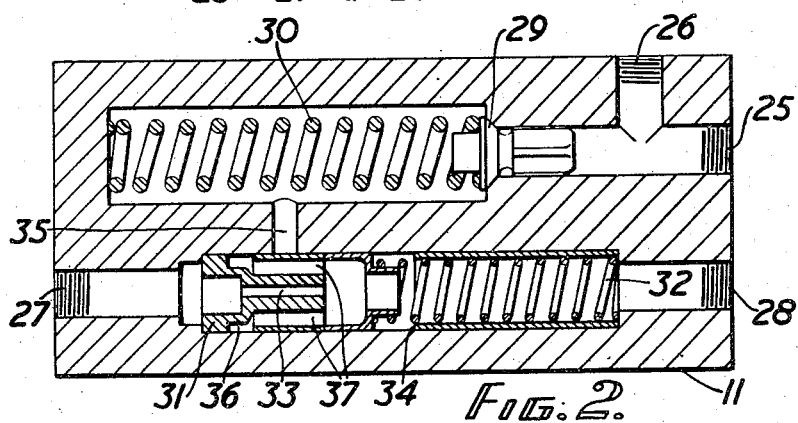
Figure 3:
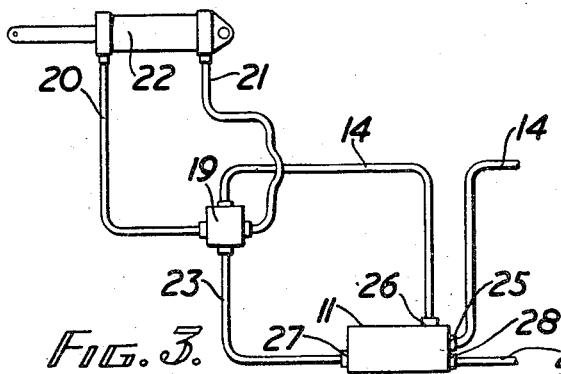

In the accompanying diagrammatic drawings illustrating by way of example some systems in accordance with the invention, Figure 1 is a diagram illustrating a typical system with a double-acting jack; Figure 2 is a sectional elevation of a unit embodying some details of the system of Figure 1; Figure 3 is a fragmentary view showing a modification of Figure 1; Figure 4 is a sectional elevation of a modified unit; Figure 5 is a fragmentary view of a system including the unit of Figure 4; and Figure 6 is a fragmentary view of a system with a single-acting jack.

The system shown in Figure 1 includes a unit 11 which will be described in connection with Figure 2. Apart from this unit and from the necessary pipe connections with it the system is a well-known one in which a pump 12 of the fixed displacement type operates continuously to withdraw hydraulic fluid from a reservoir 13 and to deliver this fluid either into a delivery line 14 or into a return line 15 leading back to the reservoir. A cut-out device 16 causes the pump to deliver into the return line 15 whenever pressure in the delivery line has reached a predetermined pressure, and causes the pump to deliver into the line 14 whenever the pressure in said line falls below a predetermined pressure. The delivery line 14 has a branch line 17 leading to an accumulator 18 and leads to the inlet of a control valve 19. The control valve 19 has pipe connections 20 and 21 leading to the opposite ends respectively of a double-acting jack 22, and has a return line 23 leading back to the reservoir 13. When the control valve is positioned to permit flow from the delivery line 14 into the line 21 to move jack to the left, the line 20 will communicate with the return line 23, and when the control valve permits flow from the line 14 into the line 20, to shift the jack to the right, the line 21 will communicate with the return line 23. In this example the line 20 includes a restrictor 24 which may be a one-way or a two-way restrictor.

When the control valve is set to bring about actuation of the jack 22, pressure in the supply line 14 and accumulator 18 will fall and eventually the pump 12 will start to deliver into the delivery line. As the rate of movement required at the jack 22 does not call for a flow equal to the rate delivered by the pump 12, pressure in the delivery line 14 will, in the absence of the unit 11, soon build up until the cut-out 16 comes into operation to divert the flow from the pump 12 into the return line 15. This cycle of operations may be repeated several times during actuation of the service which is connected with the jack, and it is in order to avoid this unnecessary operation of the cut-out 16 that the unit 11 is provided.

This unit 11 will now be described with particular reference to Figure 2. The unit 11 has internal passages with pipe connections at 25, 26, 27 and 28. (See also Figure 1.) These internal passages together form a by-pass passage between the delivery and return pipes 14 and 23 of the system. They include a relief valve 29 which is biassed towards its seating by a spring 30, and a flow-responsive valve 31 which is biassed into the position shown by a spring 32. The relief valve 29 will unseat whenever pressure in the delivery line 14 is of a sufficient magnitude. It is to be noted that the pressure necessary to unseat the valve 29 is less than the critical pressure at which the cut-out 16 comes into operation. The flow-responsive valve 31 is in the form of a piston with a restriction 33 and it moves to the right under the influence of flow in the pipe 23 entering at 27 and leaving at 28. The extent of movement of the valve 31 is limited by a shoulder 34 so that in the one extreme position shown the section 35 of the by-pass passage within the unit 11 is closed, whereas in the other extreme position it is open by being in register with an annular channel 36 of the valve 31, said channel 36 registering with a number of axially directed bores 37.

The presence of the unit 11 modifies the operation of the known system so that it functions in the following manner. Assuming that the service is being actuated by the jack and that the cut-out 16 is operated to cause the pump 12 to feed into the delivery line 14, the return flow in the pipe 23 will have moved the valve 31 to the right to open section 35 of the by-pass passage, and the pressure in the delivery line 14 will have unseated the relief valve 29 so that the by-pass passageway within the unit 11 between the delivery and return lines 14 and 23 respectively will be open to permit surplus fluid to return to the reservoir 13 whilst sufficient fluid will be supplied to the jack. This condition will prevail so long as the jack is being actuated. As soon as the jack comes to rest the flow in the return line 23 will cease and the flow-responsive valve 31 will be returned to the position in Figure 2 at which it closes the by-pass section 35. Pressure will then build up in the delivery line 14 until the cut-out 16 is brought into operation to divert the flow from the pump 12 into the return line 15. At most the cut-out will only be called into operation near the beginning and end of actuation of the jack.

The arrangement shown in Figure 3 is the same as that already described in connection with Figures 1 and 2 except that the restriction in the flow-responsive valve 31 is the sole restriction governing the rate of movement of the jack.

The modified unit 11A shown in Figure 4 is designed so that the flow-responsive valve can be situated in the delivery line instead of in the return line as in Figures 1 and 3. The unit has pipe connections 38, 39, 40 and 41, and has an intermediate passage-way section 42 leading from the flow-responsive valve 43 to the inlet end of the relief valve 44. It will be noted that the flow-responsive valve 43 is of modified shape so that when moved by flow entering at 38 and leaving at 39 flow from 38 can reach the section 42 without passing through the restriction 45 in the valve 43. Figure 5 shows a system incorporating the unit of Figure 4 and it will be seen that the delivery line 14 has connections with the unit at 38 and 39, and that the return line 23 has connections with the unit at 41 and 40. In this example there is also shown a restrictor 24 in the two lines leading from the control valve to the opposite ends of the jack. The unit 11A will perform the same function as the unit 11 of Figure 1 in eliminating unnecessary operation of the unloading mechanism associated with the pump, for when the valve 43 has moved to the left to open the section 42 of the by-pass passageway, a restricted flow will reach the control valve and an unrestricted flow will reach the relief valve 44 which, when open, will permit the excess liquid to return to the reservoir.

In Figure 6 there is illustrated part of a system in which the jack 46 is hydraulically actuated for extension only. The jack returns under the influence of its loading. The control valve 47 directs flow from the delivery line 14 to one end of the jack, or closes the line 14 and permits flow from said end of the jack into the return line 23. This system may have the unit 11A of Figure 4.

Although in the examples above described and illustrated the unloading mechanism takes the form of a cut-out and by-pass, it is to be understood that other kinds of unloading mechanism may be used. Thus the unloading mechanism may act to reduce the stroke of the pump, or to meter a reduced flow to the inlet of the pump.

I claim:

1. In a hydraulic system the combination comprising a liquid-actuated device, a pressure generator operable when on load to deliver liquid up to a predetermined rate and maximum pressure which are in excess of the requirements of the liquid-actuated device, liquid conduit means, including a delivery line and a return line, interconnecting said liquid-actuated device and said pressure generator for delivery of liquid to the liquid-actuated device and for return of liquid so delivered which is in excess of the latter's requirements, means sensitive to the pressure in the liquid conduit means and operatively associated with said pressure generator to interrupt its delivery to said liquid-actuated device automatically in response to delivery of liquid in excess of the latter's requirements, and to resume such delivery automatically in response to unfulfilled requirements thereof, a by-pass passage in said conduit means interconnecting the delivery and return lines, and valve means controlling said by-pass passage, including a flow-controlled valve biased to close said by-pass passage but sensitive to and opened automatically by flow of liquid in the conduit means, and a relief valve biased to close said by-pass passage but opened automatically in response to liquid delivery pressure sufficient to actuate said liquid-actuated device but less than the maximum delivery pressure of the pressure generator, whereby said valve means will relieve excessive pressure upon the liquid-actuated device resulting from delivery of liquid thereto in excess of that utilized by operation of said liquid-actuated device, and at the same time will obviate operation of said delivery-interrupting means.

2. A hydraulic system as in claim 1, wherein the by-pass passage is located intermediate the liquid-actuated device and the delivery-interrupting means, and the relief valve is located to be subject to the delivery pressure of the pressure generator.

3. A hydraulic system as in claim 2, characterized in that the flow-controlled valve is connected in the return line.

4. A hydraulic system as in claim 2, characterized in that the flow-controlled element is connected in the delivery line.

5. A hydraulic system as in claim 1, characterized in that the flow-controlled valve is interposed directly in the conduit means in the path of flow of fluid therein actuating the fluid-actuated device, and has a constricted aperture therein restricting flow through and the rate of movement of the fluid-actuated device.

6. A hydraulic system as in claim 1, in which the pressure generator comprises a pump, and a pressure-fluid accumulator included in the system and communicating with the conduit means at the delivery side of the pump and at a location in such conduit means between the delivery-interrupting means and the by-pass passage.

7. A hydraulic system as in claim 1, wherein the relief valve is located in the delivery line, at the entrance side of and controlling flow through the by-pass passage, and the flow-controlled valve is located in the return line, at the exit side of and controlling flow through said by-pass passage.

8. A hydraulic system as in claim 1, wherein the relief valve is located at the exit side of the by-pass passage, controlling flow thence to the return line, and the flow-controlled valve is located in the delivery line, at and controlling flow into the entrance of said by-pass passage.

9. A by-pass control device for incorporation in a hydraulic system, comprising casing means having first and second ducts therein, and a by-pass passage interconnecting the respective ducts for flow of fluid therebetween, pressure-actuated valve means received in said by-pass passage and resiliently biased normally to block flow therethrough between said ducts, but operable to open said passage automatically in response to a predetermined pressure of fluid acting on such valve, an inlet to and an outlet from said second duct independent of said by-pass passage, a flow-sensitive valve received in said second duct subject to flow therein between said inlet and outlet, and resiliently biased normally to close said by-pass passage, but operable to open said by-pass passage automatically in response to flow in said duct between inlet and outlet thereof.

10. In a by-pass control device as in claim 9, an inlet for the first duct leading into it from outside the casing, the pressure-actuated valve being subject to pressure of fluid entering through said inlet to open the by-pass passage, and the flow-sensitive valve having a constricted aperture therein affording the only communication through the second duct between the inlet and outlet ends thereof.

ERIC HIDER BOWERS.

REFERENCES CITED

The following references are of record in the file of this patent:

UNITED STATES PATENTS

| Number | Name | Date |
| --- | --- | --- |
| 1,905,133 | Bishop et al. | Apr. 25, 1933 |
| 1,912,184 | Ferris | May 30, 1933 |
| 1,990,052 | Sosa | Feb. 5, 1935 |
| 2,004,638 | Smith | June 11, 1935 |
| 2,009,608 | Douglas | July 30, 1935 |
| 2,028,766 | Ernst et al. | Jan. 28, 1936 |
| 2,160,217 | Kingsbury | May 30, 1939 |
| 2,214,816 | Harrington | Sept. 17, 1940 |
| 2,214,817 | Harrington | Sept. 17, 1940 |
| 2,226,821 | Kempson | Dec. 31, 1940 |
| 2,227,375 | Carlson | Dec. 31, 1940 |
| 2,265,800 | Connor et al. | Dec. 9, 1941 |
| 2,316,445 | Marshall | Apr. 13, 1943 |
| 2,381,528 | Trich | Aug. 7, 1945 |